Jan. 12, 1954　　　　F. E. HUMMEL　　　　2,665,629
AUTOMATIC TOASTER WITH THERMOSTATIC DELAY MEANS
Filed April 27, 1948　　　　　　　　　　2 Sheets-Sheet 2
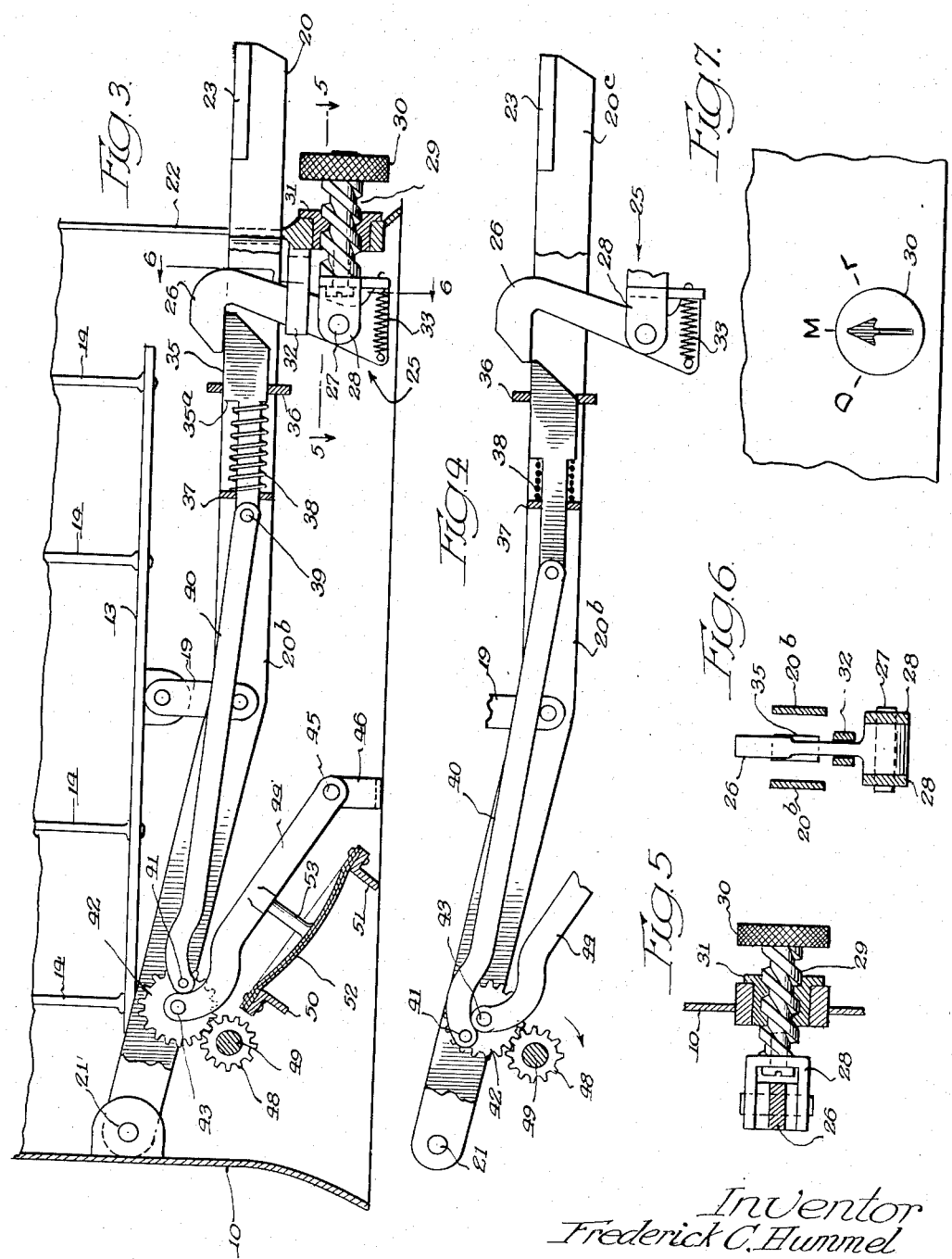
Inventor
Frederick C. Hummel
By: Fred Gerlach
Atty Patented Jan. 12, 1954

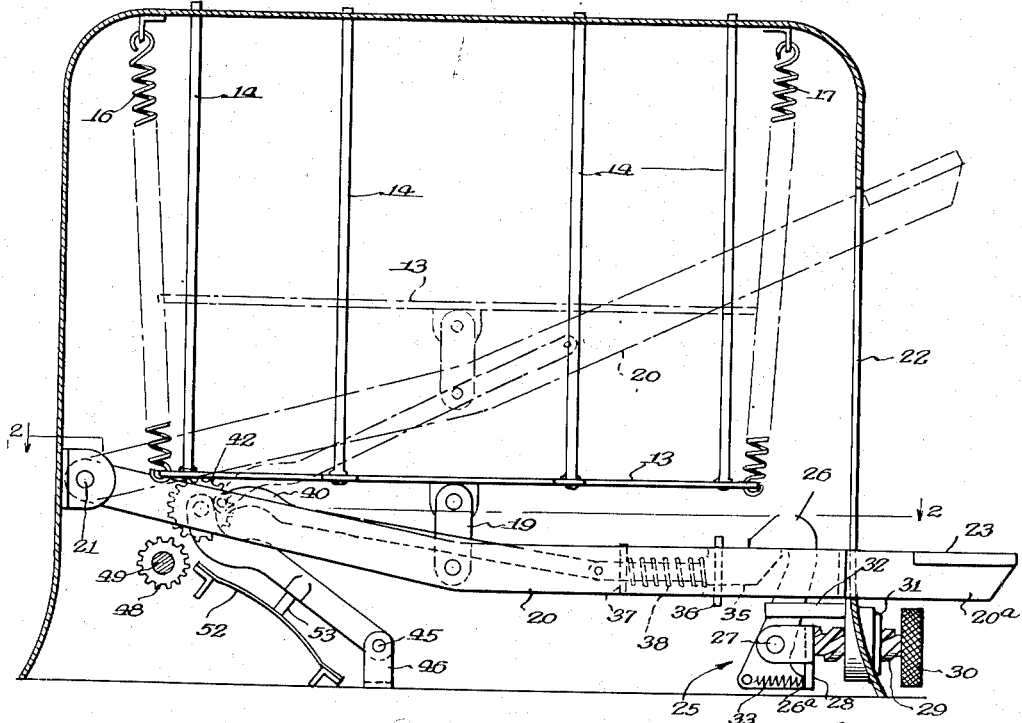

2,665,629

UNITED STATES PATENT OFFICE 2,665,629

AUTOMATIC TOASTER WITH THERMOSTATIC DELAY MEANS

Frederick E. Hummel, Chicago, Ill.

Application April 27, 1948, Serial No. 23,543

5 Claims. (Cl. 99—335)

This invention relates to electric toasters of the automatic "pop-up" variety, and it has for its principal object to provide an improved thermostatically-timed mechanism for elevating the toast, when done; and which can be adjusted to effect a variety of degrees of browning, according to the user's wishes.

Another object is to devise a timing mechanism embodying an electric motor, preferably of the synchronous type, which will operate indefinitely, without attention, thereby avoiding the use of a spring-actuated timer, which is more apt to get out of order.

Still another object is to provide an automatic toast elevating mechanism including an automatic timer which will not start counting off time until the toaster has reached a predetermined temperature—thus making it feasible to place bread in the toaster without waiting for the toaster to heat up, and with assurance that the bread, notwithstanding, will be toasted to the intended degree.

Additional objects and advantages of my invention will be brought out as the ensuing detailed description progresses.

Referring to the accompanying drawings:

Fig. 1 is a vertical section, taken at line 1—1 of Fig. 2, of an automatic toaster embodying my invention in one of its preferred forms;

Fig. 2 is a section on a horizontal plane, taken at line 2—2 of Fig. 1;

Fig. 3 is an enlarged view of the automatic "pop-up" and timing mechanism, showing the gears engaged and illustrating the conditions which obtain at the commencement of a timing cycle, immediately after the associated bread cage has been lowered;

Fig. 4 is a view similar to Fig. 3 (some parts being omitted) illustrating the action of the timer;

Fig. 5 is a section taken at line 5—5 of Fig. 3;

Fig. 6 is a section taken at line 6—6 of Fig. 3; and

Fig. 7 is a fragmentary elevational view of the timer adjusting knob, showing the indicia inscribed on the front of the toaster housing.

The toaster illustrated comprises a sheet metal housing 10 having two slot-like openings in the top for admission of two slices of bread. These openings have not been shown in the drawing because to do so would require an additional view, and they are strictly in conformity with well-established standard practice in the art. Within housing 10 are four electric heating units, which I have indicated symbolically in Fig. 2 by means of broken line rectangles 12. These also are in accordance with conventional practice, and it is both unnecessary to illustrate them and advantageous to omit them from the drawings because their omission makes the showing of the subject mechanism considerably clearer. It will be understood that there is a heater unit at either side of each slice of bread.

Also disposed within housing 10 are two cages, each designed to receive and support one slice of bread and each comprising a platform 13 on which the bread rests edgewise, and a plurality of long vertical rods 14, the lower ends of which are riveted or otherwise secured to the platform 13. Said rods extend through and are slidable in corresponding apertures in the top of the housing and function as guides, so that each entire cage is capable of being raised and lowered bodily, together with the bread or toast therein. In Fig. 1, one of the platforms 13 is shown full line in its depressed or lowered position, and is indicated in dot-dash outline in its upper or elevated position. Springs 16 and 17 attached to platforms 13 and anchored to the housing at their upper ends, function to raise the cages when the latter are released, as hereinafter explained. When a cage is in its elevated position the bread or toast therein extends above the top of the housing; but when the same is in its depressed or lowered position the bread or toast is entirely within the housing and disposed between two hot grids or heating units.

Located immediately below each cage and connected to the under side of the cage platform 13 by means of links 19 is an elongate lever 20, pivotally connected to the housing by a pin 21 and having its distal end 20a extending outwardly from the front of the housing through a vertical slot 22. Each lever 20 preferably is provided with a finger plate 23 of somewhat extended area to convenience manual operation thereof. And each said lever comprises two laterally spaced parallel bars 20b and 20c.

A latch mechanism 25, located within the lower front portion of the housing, includes a latch member 26 which is pivoted on a pin 27 in a yoke 28, which, in turn, is pivotally connected to the adjacent end of an adjusting screw 29 having a knurled knob 30 at its outer end. Screw 29 is in threaded engagement with a nut 31, which is secured to the housing. A pair of arms 32, disposed at either side of latch member 26 serve to prevent rotation of yoke 28 and said latch member about the axis of screw 29. When screw 29 is rotated, as by knob 30, the yoke 28, pin 27 and latch member 26 all move together, horizontally, in the direction determined by the direction of rotation of the screw. This movement varies and determines the toasting time, as will later be explained. The latch member is yieldably held in the posture of rotation in which it is shown in Fig. 1 by means of a spring 33; and it cannot rotate in the counterclockwise direction from its posture of Fig. 1 because it has a heel 26a which, in that posture, bears against yoke 28 and thus prevents further counterclockwise rotation. Said latch member can, however, rotate in the clockwise direction from the posture of Fig. 1, as will be apparent.

Mounted on and carried by each lever 20 is a latch bar 35, slidably supported on two crossplates 36 and 37—said latch bars being movable lengthwise and normally held in their forward positions, as illustrated in Figs. 1, 2 and 3, by means of coil springs 38 which abut the crossplates 37 at one end and shoulders 35a at the other end. The rear end of each latch bar 35 is pivotally connected at 39 to one end of an elongate pitman rod 40, the other end of which is pivotally connected at 41 to a gear 42. Said gear is rotatable on a pin 43 and mounted thereby on the distal end of a lever 44 which is fulcrumed at 45 to a bracket 46. A driving pinion or gear 48 mounted on a shaft 49 is adapted to mesh with gear 42 and to drive said gear when the two are in mesh. Shaft 49 is driven continuously, when the switch 49a is turned on, by a synchronous motor 50 through suitable reduction gearing forming a part of the motor assemblage. The speed of rotation of shaft 49 is extremely slow, by reason of the speed-reduction gearing.

Lever 44 is spring biased in the direction tending to draw gear 42 into mesh with driving gear 48. Located adjacent lever 44 and affixed at each end to supports 50 and 51 is a bi-metallic strip 52 which, when cold, assumes the curvature depicted in Fig. 1, but which, when heated to a predetermined temperature, snaps over to the opposite curvature depicted in Fig. 3. A stud 53 attached to the center of strip 52 bears against lever 44 but is not affixed thereto. When the bi-metallic strip 52 is bowed as shown in Fig. 1, stud 53 holds lever 44 in a position such as to retain gear 42 out of mesh with driving gear 48; but when the strip snaps over to the curvature of Fig. 3 said stud allows the gears to mesh. The purpose of this provision is to delay operation of the timer until the toaster is hot enough to be effective—said bi-metallic strip being responsive to the ambient temperature and designed to flex over center when an appropriate temperature has been reached.

The operation of the timing and "pop-up" mechanisms is as follows: Let it be assumed that one or both of the bread-holding cages is in the up position, as indicated in dot-dash outline in Fig. 1. A slice of bread is inserted into one of the cages (or two slices into the two cages, as the case may be) and the associated lever 20 is depressed. This pulls the cage down, against the opposition of springs 16, 17 and lowers the bread into position for toasting. As lever 20 nears its lowermost position the angular surface on the end of latch bar 35 engages the complementary angular surface of latch member 26 and thereby causes a clockwise rotation of latch member 26, which continues until latch bar 35 reaches the point where the latch member 26 is free to rotate counterclockwise under the impetus of spring 33 and thus overlie the latch bar, as depicted in Figs. 1 and 3.

If the temperature of the toaster has then reached a sufficiently high level, the strip 52 will have snapped over into the curvature of Fig. 3 and, in consequence, gear 42 will be in mesh with driving gear 48, which is in continuous rotation in the direction indicated by the arrow on Fig. 4. Therefore, as will be evident, pitman rod 40 will slowly be pulled rearwardly by gear 42 and pin 41, carrying with it the latch bar 35, against the opposition of spring 38. When a certain time has elapsed the free end of latch bar 35 will have reached the end of latch member 26, as illustrated in Fig. 4, whereupon the lever 20 is free to move upwardly, together with latch bar 35, under the impetus of springs 16 and 17. Hence, said lever 20 and the toast-holding cage connected thereto will rise abruptly. The upward movement of lever 20 causes driven gear 42 to disengage driving gear 48, leaving the driven gear free; and spring 38 thereupon restores latch bar 35 to its extended position and at the same time moves the pitman rod 40 so that pin 41 is restored to the starting point, as per Fig. 3.

If the temperature has not yet reached the required degree when one of the levers 20 is depressed, gear 42 will not engage driving gear 48 because of the interference of stud 53 with lever 44. The curvature of bi-metallic strip 52 is shown with considerable exaggeration for the sake of clarity.

The elapsed toasting time, obviously, is a function of the amount of overlap between latch member 26 and latch bar 35, as depicted in Figs. 1 and 3, at the commencement of each operation; and it follows that the timing can be varied by altering said overlap. This is the purpose of adjusting screw 29. By rotating said screw in one direction, the overlap can be increased, and vice versa.

Knobs 30 may each be provided with an indicating arrow, as shown in Fig. 7, and the housing may be inscribed with the letters "D," "M" and "L," meaning dark, medium and light, respectively.

While I have described the preferred embodiment of my invention, it will be apparent that there are many possible modifications within the scope and purview thereof and, accordingly, I do not wish to be limited otherwise than as indicated by the terms of the appended claims.

Having described my invention, what I claim as new and wish to secure by Letters Patent is:

1. In combination, a toaster housing, vertically reciprocable bread-supporting means in said housing, a lever pivotally mounted in said housing, a link having one end secured to said bread-supporting means and its other end secured to said lever, a latch bar carried by said lever and movable lengthwise thereof, a latch member latchingly engageable with said latch bar for holding said lever in a given position, a driving gear, means for continuously rotating said driving gear, a driven gear, thermo-responsive means operative to effect intermeshing of said gears when the ambient temperature is above a predetermined value, and means interconnecting said driven gear with said latch bar and operative to retract said latch bar in response to rotation of said driven gear.

2. In combination, a toaster housing, vertically reciprocable bread supporting means in said housing, a lever fulcrumed at one end to said housing, a link connected at one end to said bread-supporting means and at its other end to said lever, a latch bar carried by said lever and movable lengthwise thereof to a limited extent, a latch member latchingly engageable with said latch bar for holding said lever in a given position, a spring urging said latch bar toward latching engagement with said latch member but yieldable to permit said latch bar to be withdrawn from engagement with said latch member, said latch member being movable bodily lengthwise of said latch bar so as to vary the extent of overlap therebetween, a motor operative to move said latch bar out of engagement with said latch member, means for coupling said motor to said latch bar to effect a driving interconnection therebetween, said means comprising a gear driven by said motor, a second lever pivoted in said housing, a gear rotatably mounted on said second lever, and a rod having one end eccentrically connected to said second gear and its other end connected to said latch bar, and thermo-responsive means carrying a stud engaging said second lever to prevent the gear mounted on said second lever from meshing with the gear driven by said motor when the ambient temperature is below a certain predetermined value, said thermo-responsive means moving said stud in response to ambient temperature above said predetermined value to cause said second mentioned gear to mesh with said driving gear.

3. In combination, a toaster housing, vertically reciprocable bread-supporting means in said housing, a lever pivotally mounted in said housing, a link connecting said lever to said bread-supporting means, a latch bar carried by said lever and movable lengthwise thereof to a limited extent, a latch member latchingly engageable with said latch bar for holding said lever in a given position, a spring urging said latch bar toward latching engagement with said latch member but yieldable to permit said latch bar to be withdrawn from engagement with said latch member, an adjusting screw operative to move said latch member lengthwise of said latch bar so as to vary the extent of overlap therebetween, a motor operative to move said latch bar out of engagement with said latch member against the opposition of said spring, coupling means engageable only when said lever is in said given position, said coupling means comprising a gear driven by said motor, a second lever pivoted in said housing, a gear rotatably mounted on said second lever, and a rod having one end eccentrically connected to said second gear and its other end connected to said latch bar, and thermo-responsive means carrying a stud engaging said second lever to prevent intermeshing of said gears when the ambient temperature is below a certain predetermined value, said thermo-responsive means moving said stud in response to ambient temperature above said predetermined value to cause said gears to intermesh.

4. The combination in a toaster having a housing, of vertically reciprocable bread-supporting means within said housing, spring means urging said bread-supporting means upwardly, a lever disposed below said bread-supporting means and connected thereto so as to move in unison therewith, said lever being fulcrumed at one end and having its distal end extending outside said housing, a latch bar carried by said lever and movable lengthwise thereof to a limited extent, a latch member latchingly engageable with said latch bar for holding said lever and bread-supporting means in down position, a spring urging said latch bar toward latching engagement with said latch member but yieldable to permit said latch bar to be withdrawn from engagement with said latch member, an adjusting screw operative manually to move said latch member lengthwise of said latch bar so as to vary the extent of overlap therebetween, a motor, a driving gear driven by said motor, a driven gear movable into and out of engagement with said driving gear, a pitman rod interconnecting said driven gear with said latch bar, a second lever fulcrumed at one end and supporting said driven gear at its distal end and thermo-responsive means operative to obstruct said second lever to prevent meshing of said gears when the ambient temperature is below a certain prescribed value, said second lever and pitman rod being operative, conjointly, to move said driven gear into mesh with said driving gear when said first mentioned lever is in its latched position and the ambient temperature is above said predetermined value, said driven gear, when meshed with said driving gear, being operable, through said pitman rod, to move said latch bar out of engagement with said latch member, thereby causing said first mentioned spring means to move said bread-supporting means upwardly.

5. The combination defined by claim 4, characterized in that the pitman rod is connected to the driven gear through the medium of a crank pin carried by the driven gear.

FREDERICK E. HUMMEL.

References Cited in the file of this patent

UNITED STATES PATENTS

| Number | Name | Date |
|---|---|---|
| 639,139 | Bickelhaupt | Dec. 12, 1899 |
| 846,470 | Hermance | Mar. 12, 1907 |
| 1,149,590 | Moe | Aug. 10, 1915 |
| 1,822,433 | Brand | Sept. 8, 1931 |
| 1,987,703 | Oneill | Jan. 15, 1935 |
| 2,207,947 | Sardeson | July 16, 1940 |
| 2,243,953 | Graham | June 3, 1941 |
| 2,266,024 | Gomersall | Dec. 16, 1941 |
| 2,288,748 | Scharf | July 7, 1942 |
| 2,343,347 | Turner | Mar. 7, 1944 |
| 2,361,078 | Anderson | Oct. 24, 1944 |
| 2,389,927 | Parr | Nov. 27, 1945 |
| 2,436,448 | Padelford | Feb. 24, 1948 |
| 2,439,017 | Meyers | Apr. 6, 1948 |
| 2,446,935 | Kreer | Aug. 10, 1948 |